United States Patent [19]

Aoki

[11] 3,998,288
[45] Dec. 21, 1976

[54] WHEELED VEHICLE FOR CONVEYING LOADS
[75] Inventor: Osamu Aoki, Nagahama Kochi, Japan
[73] Assignee: Shikoku Kenki Kabushiki Kaisha, Yokohama Kochi, Japan
[22] Filed: Feb. 5, 1975
[21] Appl. No.: 547,335
[30] Foreign Application Priority Data
  May 7, 1974  Japan .................. 49-52447
[52] U.S. Cl. ................ 180/26 R; 280/91; 280/96
[51] Int. Cl.² ........................ B62D 61/06
[58] Field of Search ......... 180/25 R, 26 R, 26 A, 180/27, 48; 280/91, 87 R

[56] References Cited
UNITED STATES PATENTS

| 1,061,104 | 5/1913 | Nett | 180/26 R |
| 1,716,732 | 6/1929 | Mossay | 280/87 R |
| 2,559,379 | 7/1951 | Szekely | 280/87 R |
| 3,087,564 | 4/1963 | Quayle | 280/91 |
| 3,197,229 | 7/1965 | Houlton | 180/77 S |

FOREIGN PATENTS OR APPLICATIONS 1,092,380  11/1960  Germany .................. 180/48

Primary Examiner—Philip Goodman
Assistant Examiner—John P. Silverstrim
Attorney, Agent, or Firm—Fleit & Jacobson

[57] ABSTRACT

This invention relates to an improvement in a wheeled vehicle upon which is mounted a crane or fork lift. More particularly, this invention relates to a wheeled vehicle for conveying loads including a machine bed upon which are mounted three wheel fitting yokes, one rear and two front, to which wheels are respectively attached in the rear center and both front sides of the machine bed as to revolve freely and independently. For steering purposes, an oil pressure power cylinder is connected to each of the wheel fitting yokes through a rack and pinion gear and for locomotion an oil pressure motor furnishes power to the wheels. The wheels may be moved along a circle which passes through the point of ground contact of each wheel, thereby rotating the wheeled vehicle about a circular path centered near the middle of the vehicle. Alternatively, the wheel fitting yokes may be oriented for sidewise motion of the wheeled vehicle.

4 Claims, 6 Drawing Figures

WHEELED VEHICLE FOR CONVEYING LOADS

BACKGROUND OF THE INVENTION

This invention relates to a wheeled vehicle upon which is mounted a lifting means for conveying loads, such as a crane or a fork lift.

Vehicles used conventionally for conveying loads typically employ a heavy body and are equipped with highly complex means for revolving. In addition, the working environment where such vehicles are often used, such as storage areas, warehouses, construction sites and the like, is frequently confining. Since the conventional vehicle requires a relatively large amount of space for changing direction, it can be revolved only with difficulty under typical working conditions. Furthermore, sidewise operation of such conventional vehicles when carrying a load is difficult due to instability.

The present invention relates to a novel apparatus which remedies these and other defects of vehicles of conventional design. In particular, the complicated revolving equipment found in a conventional vehicle is eliminated, and the vehicle weight is lessened through overall design simplication.

In performing a revolution, the three wheels of the wheeled vehicle of the present invention can be oriented so that each wheel travels along a circle centered near the middle of the vehicle, and passing through the point of ground contact of each wheel, thereby minimizing the radius of revolution of the vehicle. Since the direction of movement of the vehicle is always along a direction tangential to the circle, a consequence which follows from such a manner of revolution is a highly stabilized body, even when the body comprises the vehicle with a suspended load.

DESCRIPTION OF THE PREFERRED EMBODIMENTS

Figure 1:
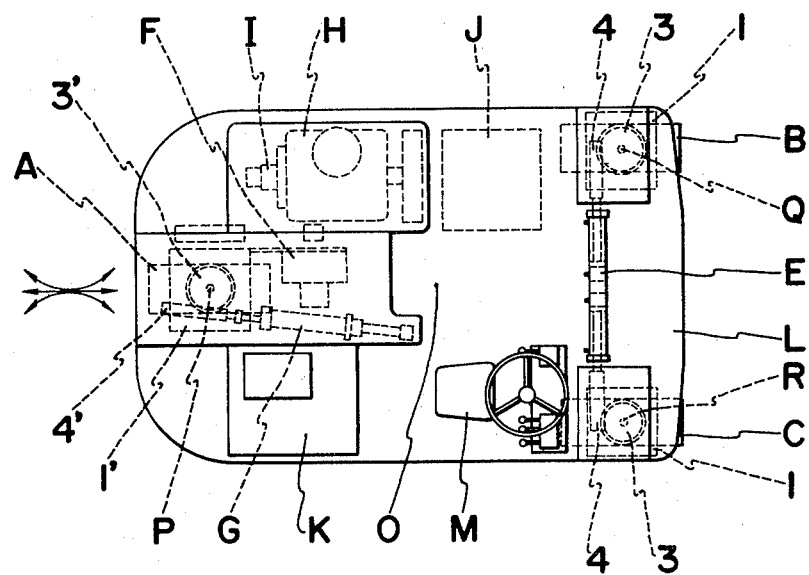
FIG. 1 is a plan view of the vehicle in accordance with this invention.
Figure 2:
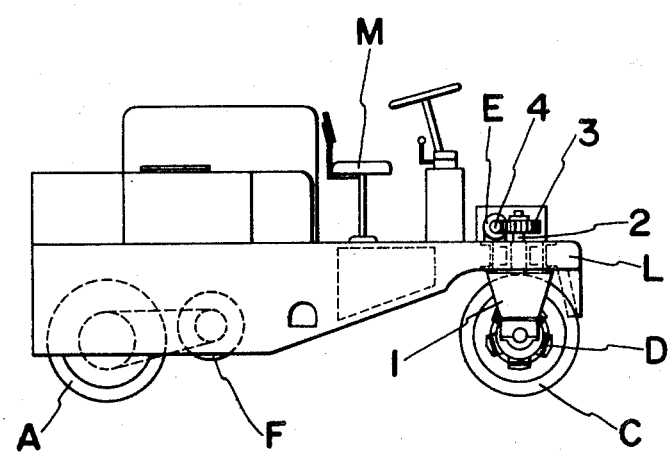
FIG. 2 is a side view of the vehicle shown in FIG. 1.

Referring to FIGS. 1 and 2, L is a machine bed made of steel plate or shaped steel. Metal fitting yokes 1 are attached to the left and right front sides of machine bed L to vertical axles 2 so as to revolve freely. Wheels B and C are fitted to fitting yokes 1. An oil pressure motor D for driving the wheels is operatively associated with and fitted to wheel C. A pinion gear 3 is attached to the top of each of vertical axles 2 of wheel fitting yokes 1. A double-acting oil pressure cylinder E houses two pistons and associated piston rods which are axially aligned with the pistons facing each other. A rack gear 4 is attached to each of the piston rods and is engaged with each of pinion gears 3.

A rear wheel A is attached to the rear center of machine bed L so as to revolve freely when mounted in fitting yoke 1'. Pinion gear 3' is attached to the top of a vertical axle mounting fitting yoke 1' to machine bed L. An oil pressure motor F for driving wheel A is operatively associated with wheel A and rotates with wheel fitting yoke 1' as a single body. A double-acting oil pressure cylinder G houses a piston and associated piston rod. A rack gear 4' engages pinion gear 3' as well as the piston rod in cylinder G.

Figure 5:
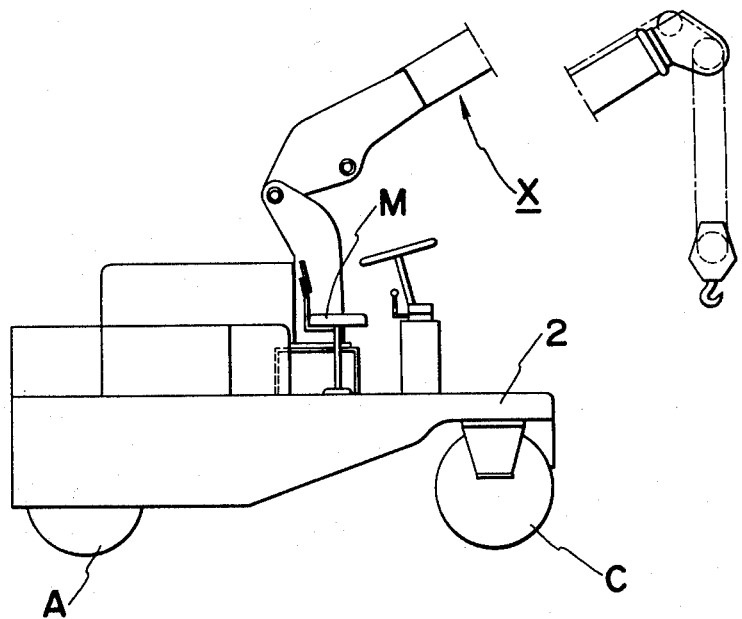
FIG. 5 is a side view which shows a configuration in which a crane is mounted on the vehicle of FIG. 1.
Figure 6:
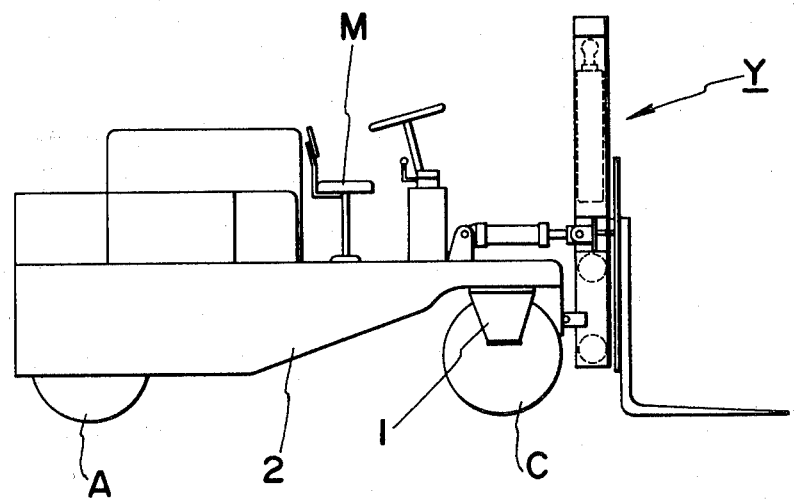
FIG. 6 is a side view which shows a configuration in which a fork lift is mounted on the vehicle of FIG. 1.

An engine H is installed on machine bed L and drives oil pressure pump I. Engine H is supplied with fuel from fuel tank J. The wheeled vehicle also includes driver's seat M and oil tank K for the oil pressure apparatus. The wheeled vehicle for conveying loads according to this invention may be equipped with oil pressure crane X mounted on machine bed L as shown in FIG. 5, or may be equipped with oil pressure fork lift Y mounted on the machine bed L as shown in FIG. 6. The wheeled vehicle is used as a crane or fork lift vehicle by controlling the oil pressure by means of an operating handle or lever located near the driver's seat M.

The function and operation of the wheeled vehicle according to the invention will now be described. When operating the wheeled vehicle, as shown in FIG. 1, it is possible to operate the wheeled vehicle conventionally by turning the rear wheel A and front wheels B and C parallel to the direction of a line drawn through points O and P in FIG. 1 with oil pressure power cylinders G and E, respectively. Rear wheel A is driven by oil pressure motor F, and steering is achieved by controlling rear wheel A with oil pressure power cylinder G. When operating the wheeled vehicle this way, it is possible to make front wheels B and C follow rear wheel A by releasing the oil pressure in oil pressure motor D located on the front wheel C. Accordingly, it is possible to go forward or back or change the direction to left or right as illustrated by arrows in FIG. 1.

Figure 3:
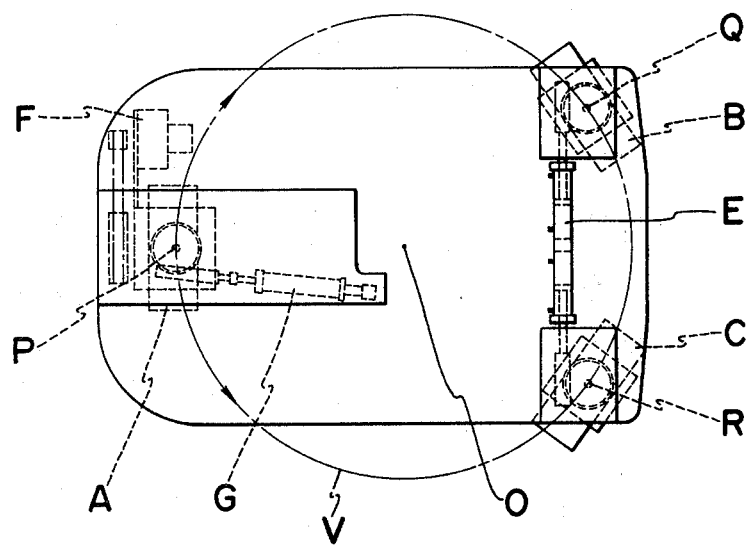
FIG. 3 is a plan view which shows the revolution of the vehicle shown in FIG. 1.

It is possible to make the wheeled vehicle revolve as shown in FIG. 3 as follows. The direction of rear wheel A is changed with oil pressure power cylinder G to form a right angle with a line drawn through points O and P. Then, front wheels B and C are rotated by oil pressure power cylinder E to form a right angle with a line drawn through points O and Q and a line drawn through points O and R, respectively. Each wheel, A, B and C, is then caused to move on the circle V with center O, which is the center of a circle passing through the middle of each of wheels A, B and C. The above movement is accomplished according to one of the following two methods. In the first method, the oil pressure in motor D is cut off and rear wheel A is driven with oil pressure motor F, thereby causing each wheel A, B and C to move forward along circle V. In the second method, front wheel C is driven with oil pressure motor D and the oil pressure to motor F is cut off.

Accordingly, the point O, as is clear in the example described above, is the center of revolution of circle V of the wheeled vehicle, and each contact point P, Q and R with earth of wheels A, B and C, respectively, is constructed so as to lie on the circle V, and the wheeled vehicle therefore revolves in a space little more than its own, without any movement to and fro from the center point O.

Figure 4:
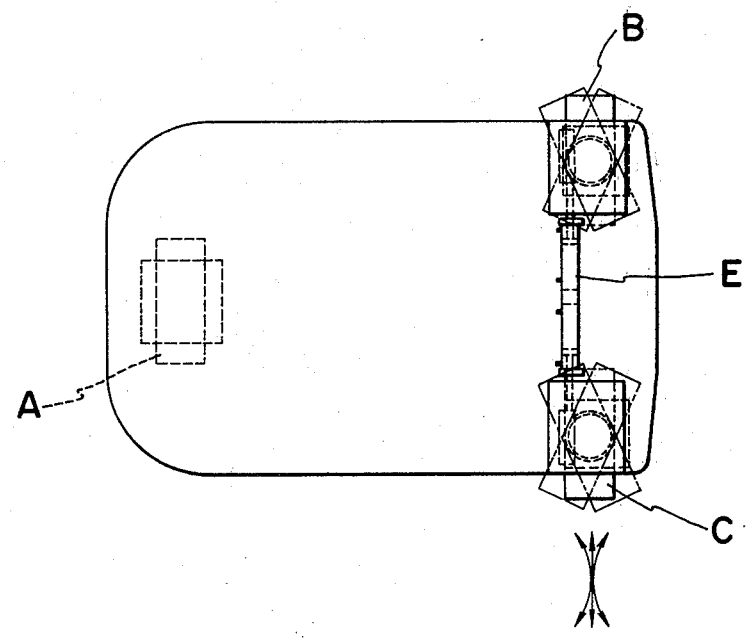
FIG. 4 is a plan view which shows the direction of the wheels when the vehicle shown in FIG. 1 is run sidewise.

Further, as shown in FIG. 4, it is possible to make the wheeled vehicle run sidewise in the desired direction by operating rear wheel A by the same method described above, but appropriately changing the direction of the front wheels B and C by oil pressure cylinder E. For instance, to operate sidewise in a direction parallel to the direction of rear wheel A, the direction of the front wheels B and C is made parallel to the direction of rear wheel A, or they may form oblique angles as also illustrated in FIG. 4.

In the example described above, when the directions of the front wheels B and C are changed with oil pressure power cylinder E, cylinder E is provided with an oil pressure circuit which acts so that both front wheels B and C change direction so as to maintain the same angle with respect to the cylinder. Accordingly, when the front wheel C is driven by the oil pressure motor D, and the oil pressure of motor F is cut off, the wheeled vehicle moves along the motion locus of the front wheels B and C, and the rear wheel A rotates freely in accordance with the path determined by the front wheels B and C, and the wheeled vehicle may be ahead or back by running sidewise or obliquely, as shown by arrows in FIG. 4.

I claim:

1. In a wheeled vehicle for mounting means for conveying loads, the improvement comprising a machine bed, wheel fitting yokes carrying a rear wheel and two front wheels, respectively, attached to said machine bed, said rear wheel yoke being attached to the rear center of said machine bed, and said front wheel yokes being attached to both front sides of said machine bed, said rear wheel and one of said front wheels being independently powered by oil pressure motors, an independently operable oil pressure power cylinder for rotating said rear wheel yoke through a steering angle and an independently operable oil pressure power cylinder for simultaneously rotating said front wheels through opposite and equal steering angles.

2. The wheeled vehicle of claim 1 further comprising rack and pinion gears for linking said independently operable oil pressure power cylinders to each of said wheel yokes.

3. The wheeled vehicle of claim 1 wherein said independently operable oil pressure power cylinder linked to said rear wheel yoke includes a piston and a piston rod within said cylinder, and wherein said independently operable oil pressure cylinder linked to said front wheel yokes includes a pair of pistons and piston rods within said cylinder, said pistons and piston rods associated with each of said wheel yokes and a rack gear attached to each said piston rod, a pinion gear attached to the top of each said wheel yokes, and engaged with said rack gear, whereby each of said wheels can be steered.

4. The wheeled vehicle of claim 1 wherein each of said wheels is adapted to be rotated 360° about a vertical axis by said independently operable oil pressure power cylinders.

* * * * *